THE SYSTEM LiF - NaF - $BeF_2$

INVENTOR
Seymour Senderoff
BY Charles L. Mc[illegible]
ATTORNEY

THE SYSTEM NaF-KF-BeF2

INVENTOR
Seymour Senderoff
BY Charles J. Metz
ATTORNEY

INVENTOR
Seymour Senderoff
BY
ATTORNEY

INVENTOR
Seymour Senderoff
BY Charles J. McTy
ATTORNEY

DISCHARGE CURVE OF $Be,NiF_2$ CELL IN SOLUTION II AT 65 $mA/cm^2$ (UPPER) and 300 $mA/cm^2$ (LOWER) TEMP., 400°C.

CHRONOPOTENTIOGRAM OF CHARGE AND DISCHARGE OF NICKEL IN SOLUTION I at 200 $mA/cm^2$. The 0.2 polarization shown is accounted for by IR drop in the electrolyte. Temp, 400°C INVENTOR
*Seymour Senderoff*
BY Charles J. Metz
ATTORNEY CHRONOPOTENTIOGRAM OF CHARGE AND DISCHARGE OF Cu IN SOLUTION I AT 50 mA/cm². Temp. 370° C CHRONOPOTENTIOGRAM OF CHARGE AND DISCHARGE OF Cu IN SOLUTION I AT 200 mA/cm². Temp. 370°C INVENTOR
*Seymour Senderoff*
BY
ATTORNEY CHRONOPOTENTIOGRAM OF SILVER CHARGED AT 150mA/cm$^2$ AND DISCHARGED AT 50mA/cm$^2$ IN SOLUTION I Temp, 370°C CHRONOPOTENTIOGRAM OF CHARGE AND DISCHARGE OF Ag IN SOLUTION II AT 100mA/cm$^2$ SHOWING SINGLE STEP PROCESS Temperature 400° C INVENTOR
Seymour Senderoff
BY
ATTORNEY United States Patent Office Re. 28,250
Reissued Nov. 26, 1974

28,250

RECHARGEABLE ELECTRO-CHEMICAL CELL HAVING COMPLEX METAL FLUORIDE ELECTROLYTE

Seymour Senderoff, Fairview Park, Ohio, assignor to Union Carbide Corp., New York, N.Y.

Original No. 3,725,128, dated Apr. 3, 1973, Ser. No. 123,570, Mar. 12, 1971. Application for reissue May 31, 1973, Ser. No. 365,685
Int. Cl. H01m *36/00*
U.S. Cl. 136—6 LF 21 Claims

Matter enclosed in heavy brackets [ ] appears in the original patent but forms no part of this reissue specification; matter printed in italics indicates the additions made by reissue.

ABSTRACT OF THE DISCLOSURE

Rechargeable electrochemical cells are disclosed having complex metal fluoride electrolytes comprising an alkali metal fluoberyllate or fluozirconate. In the charged condition, the anode is a metal not greater in activity in the electromotive series than beryllium or zirconium, respectively, and the cathode is the fluoride of a metal less active in the electromotive series than the metal of the anode. A preferred cell has, in the charged condition, a beryllium anode, a nickel fluoride or silver fluoride cathode, and an alkali metal fluoberyllate electrolyte.

The invention relates to rechargeable electrochemical cells having alkali metal fluoberyllate or fluozirconate electrolytes. In one aspect, the invention relates to rechargeable thermal batteries having an alkali metal fluoberyllate or fluozirconate electrolytes.

In view of the high energy density and high rate capabilities of thermal batteries, there has been considerable interest in such batteries as candidates for long lived secondary batteries for use in electric cars. To date, however, most thermal batteries in use today are reserve primary batteries that are activated by heat and discharged at a high rate in a few seconds or minutes. There has, however, been considerable research and development work done on four types of secondary thermal batteries. These types are the lithium/chlorine cell, the sodium/sulfur cell, the sodium/air cell, and the lithium/chalcogen (tellurium, selenium, or sulfur) cells.

Each of these types of cells has certain important disadvantages. For instance, the lithium/chlorine cell uses molten lithium, which is highly corrosive at operating temperature (about 650° C.), and pressurized chlorine gas. Therefore, expensive corrosion resistant materials must be employed, and means must be found to substantially eliminate the possibility of chlorine leakage. The electrolyte employed in the sodium/sulfur cell is beta aluminum oxide, a ceramic that is sensitive to mechanical and thermal shock. Also, the relatively high resistivity of beta aluminum oxide limits this cell to modest current densities. The current densities available from the sodium/air cell are relatively low, owing to sodium diffusion limitations and loss of voltage at the interface between the fused salt electrolyte and the sodium electrode. One severe design limitation common to all of these cells is that they must provide for the utilization of liquid metal anodes and either liquid or gaseous cathodes. A review of thermal cells, and utilities therefor, is found in an article by Cairns et al., "High-Temperature Batteries," Science 164, Number 3886, 1347 (June 20, 1969).

Hunt et al., in U.S. Pat. No. 3,498,843 described a thermal cell having an electrochemically active metal anode (e.g., magnesium or sodium), a transition metal fluoride cathode, and an electrolyte consisting of alkali metal fluoride, alkaline earth metal fluoride, or mixtures thereof. There is no mention in the patent of rechargeability of the cells described. Indeed, since most of the cathode materials disclosed are known to be thermally unstable (e.g., $K_3CuF_6$, $K_2MnF_6$, $K_3NiF_6$, and the like), the Hunt et al. cells apparently cannot be employed as secondary batteries.

The present invention is based upon the discovery that certain thermal cells utilizing fluoberyllate or fluozirconate electrolytes and which have solid electrodes at use temperatures, are rechargeable. These cells therefore possess valuable utility as secondary batteries. Accordingly, it is an object of the invention to provide rechargeable thermal cells.

Another object of the invention is to provide an electrochemical cell having a fluoberyllate or a fluozirconate electrolyte.

Still another object of the invention is to provide rechargeable thermal cells having electrodes which are solids at the temperature of operation.

A further object of the invention is to provide an electrochemical cell having a beryllium anode, an alkali metal fluoberyllate electrolyte, and a metal fluoride cathode.

A still further object of the invention is to provide an electrochemical cell having a zirconium anode, an alkali metal fluozirconate electrolyte, and a metal fluoride cathode.

An additional object of the invention is to provide a secondary thermal electrochemical cell having relatively stable components.

These and other objects and advantages of the invention will be apparent from the following description, taken in conjunction with the accompanying drawings, wherein.

Broadly, the rechargeable electrochemical cell of the invention has an anode, a cathode, and an electrolyte in contact with the anode and cathode, wherein, in the charged condition, the electrolyte comprises alkali metal fluometalate wherein the metalate is beryllate or zirconate, the anode comprises a metal equal in activity to or less active in the electromotive series than the metal of said metalate, and the cathode comprises the fluoride of a metal less active in the electromotive series than the metal of the anode.

An important feature of the present invention resides in the provision of an electrolyte comprising an alkali metal fluoberyllate or fluozirconate. Referring first to the fluoberyllate system, an alkali metal fluoberyllate can be considered to be a mixture of alkali metal fluoride and beryllium fluoride ($BeF_2$). Thus, this electrolyte will contain $BeF_2$ plus one or more of, for instance, lithium fluoride, sodium fluoride and potassium fluoride. Cesium and rubidium fluorides could also be present, although systems containing substantial amounts of these materials often tend to have higher melting points, which would detract from the commercial attractiveness of such systems in many cases.

Preferred electrolytes include those that have relatively low melting points, and especially those whose melting points do not increase rapidly with increasing concentration of $BeF_2$. (The $BeF_2$ content of the electrolyte will increase during discharge when a beryllium anode is used owing to dissolution of the anode.) Specific examples of electrolytes having relatively low melting points, and whose melting points do not increase rapidly with increasing concentrations of $BeF_2$, include those displayed in the following table, which also displays the melting points and resistivities of these electrolytes:

TABLE I.—ELECTROLYTE COMPOSITION (MOL. PERCENT)

| | Solution | | |
|---|---|---|---|
| | I | II | III |
| Composition: | | | |
| $BeF_2$ | 37.5 | 47.5 | 58 |
| LiF | 31.5 | | |
| NaF | 31.0 | 26.3 | |
| KF | | 26.3 | 42 |
| M.P. (° C.) | 315 | 350 | 360 |
| Resistivity (Ωcm.) [1] | 1 | 3 | 5 |

[1] Approximate values (±25% at 450° C.).

Figure 1:
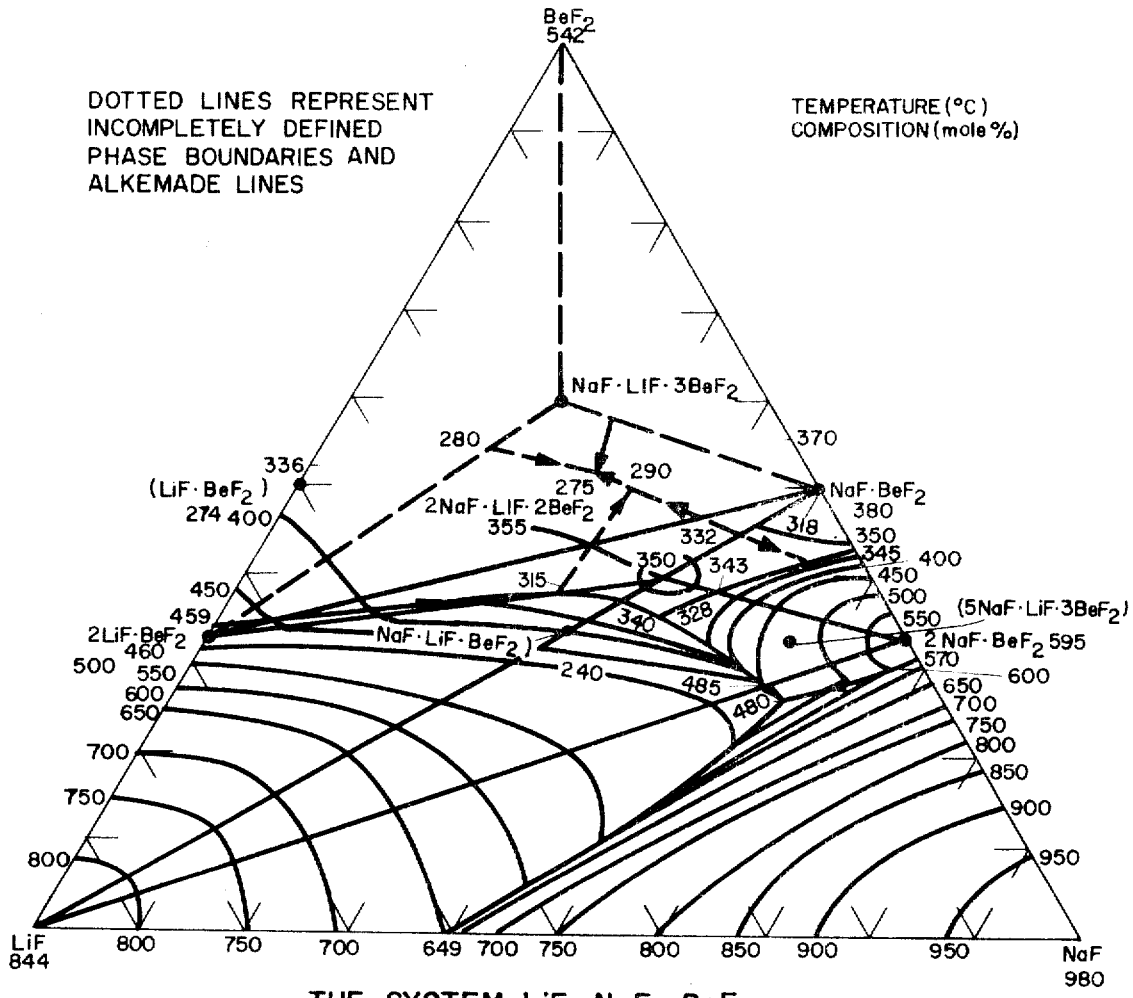
FIG. 1 is a phase diagram of the system lithium fluoride-sodium fluoride-beryllium fluoride.
Figure 2:
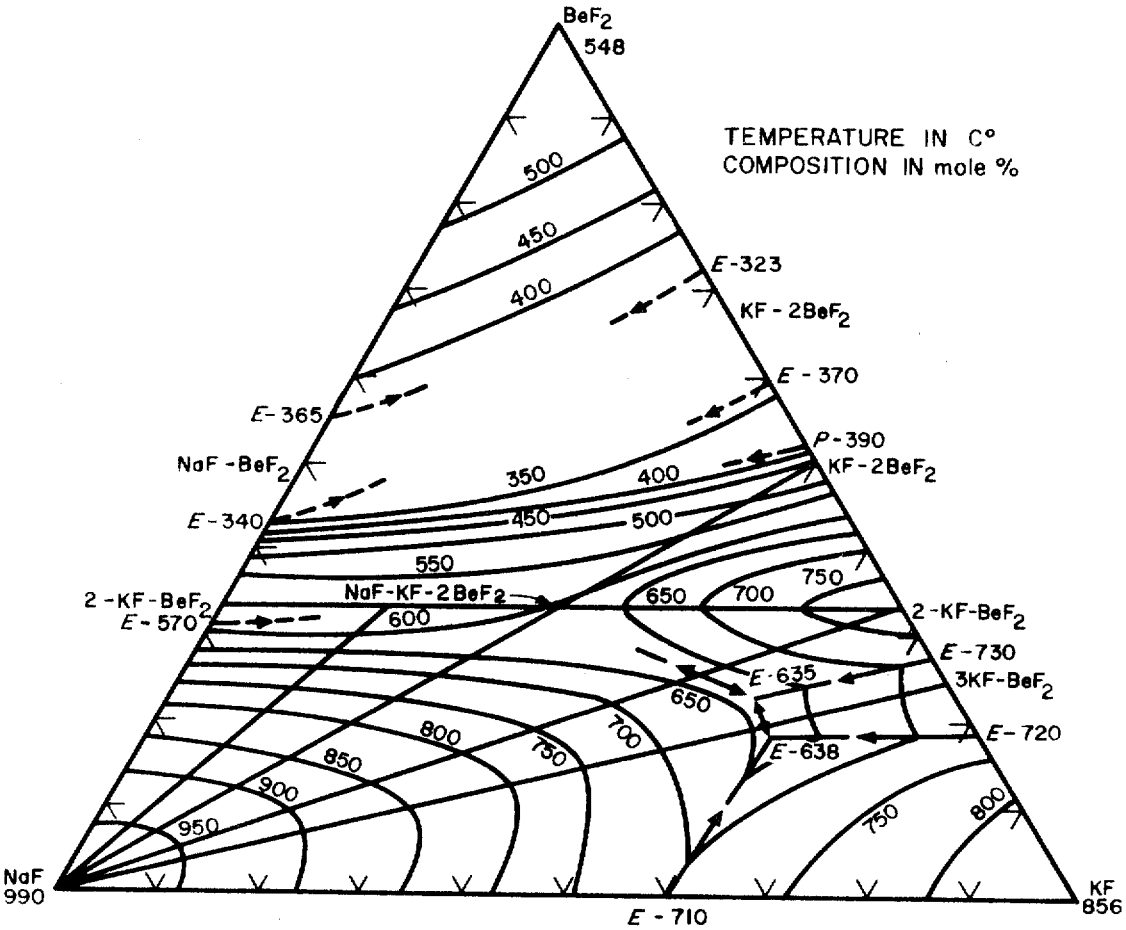
FIG. 2 is a phase diagram of the system sodium fluoride-potassium fluoride-beryllium fluoride.
Figure 3:
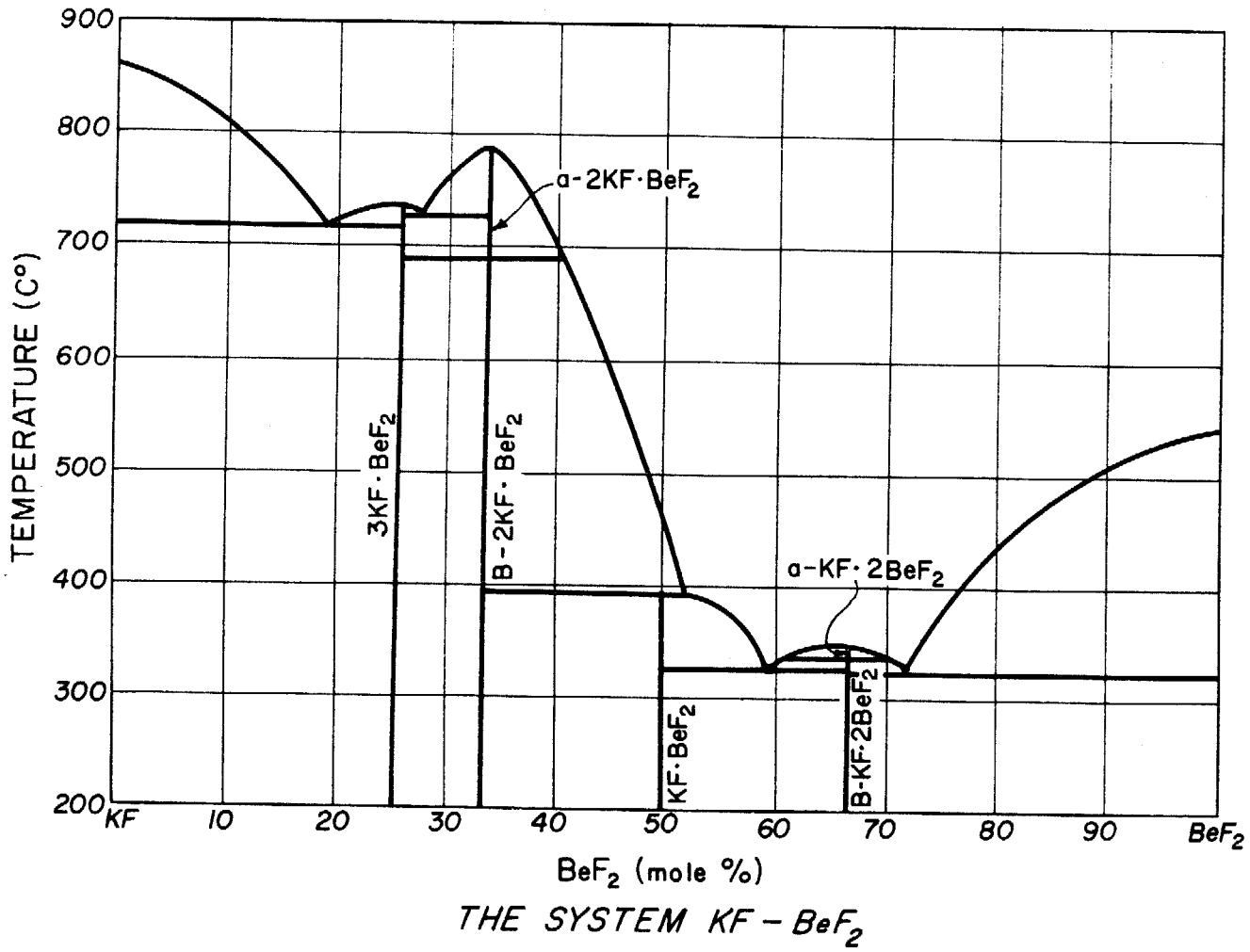
FIG. 3 is a phase diagram of the system potassium fluoride-beryllium fluoride.

FIGS. 1, 2, and 3 display, respectively, phase diagrams of the mixtures lithium fluoride-sodium fluoride-beryllium fluoride, sodium fluoride-potassium fluoride-beryllium fluoride, and potassium fluoride-beryllium fluoride. These phase diagrams can be employed in a manner known in the art to aid in selecting an appropriate electrolyte composition having the desired melting point and beryllium fluoride concentration.

The factors to consider in selecting a particular electrolyte for use in the invention include one or more of the following:

As a general rule, the lower the melting point of the electrolyte the better. However, when use as a heat activated reserve cell is intended, the melting point should be higher than any ambient temperature that can reasonably be expected to be encountered. Electrolyte melting points of between about 350° C. and about 600° C. are most frequently encountered. Electrolyte melting points below about 400° C. are preferred in most cases. However, since cells embodying the principles of the invention have been operated at quite high temperatures, for instance, up to about 800° C., electrolyte melting points in excess of about 600° C. are permissible, in some cases.

The exact concentration of beryllium fluoride desired in the electrolyte will vary from one system to another, depending upon the nature of the materials in the electrolyte. An important factor to consider in selecting the proportion of beryllium fluoride is the maintenance of the melting point of the electrolyte below a preselected point throughout the entire range of electrolyte compositions prevailing throughout the charge-discharge cycle of the cell. Thus, referring to FIG. 3, which shows the phase diagram for the system KF–$BeF_2$, when employing a mixture of potassium fluoride and beryllium fluoride as the electrolyte, along with a beryllium anode, the concentration of $BeF_2$ in the electrolyte when the cell is in the charged condition is preferably from about 52 to about 60 mole percent, in order to keep the melting point of this electrolyte below about 400° C. during the charge-discharge cycle of the cell. In calculating the amount of $BeF_2$ that will be added to the electrolyte during cell discharge, normally not more than about 75 percent of the anode will dissolve in the electrolyte during discharge. The preferred amount of beryllium fluoride to use in other electrolyte systems can be readily determined in an analogous manner by resort to the appropriate phase diagram, such as those shown in FIGS. 1 and 2. (Phase diagrams of mixtures of various metal fluorides, including such mixtures containing $BeF_2$ or $ZrF_4$, are found in "Phase Diagrams of Nuclear Reactor Materials," R. E. Thoma, ed., ORNL–2548).

The function of the $BeF_2$ in the electrolyte is to supply beryllium for the anode in order to impart rechargeability to the cell. The alkali metal fluoride functions to lower the melting point and increase the conductivity of the electrolyte. In theory, the fluoride of any metal higher than beryllium in the electromotive series can be present in the electrolyte in place of some or all of the alkali metal fluoride. However, such metals include thorium (which is expensive and radioactive), rare earths (which are expensive), and alkaline earth metals (whose fluorides have very high melting points). The indicated disadvantages of these materials would appear to suggest that their use as major components of the electrolyte would be undesired for most commercial applications.

A table displaying the standard electromotive forces for solid and molten metallic fluorides, which is the EMF series that is applicable to this invention, is found in Hamer et al., "EMF Forces For Cells Containing Halides," J. Electrochem. Soc. 112, 750, 751 (1965).

The anode material is a metal that is equal in activity or less active in the electromotive series than beryllium. Preferably, the anode material is beryllium. However, other metals such as titanium or aluminum can be employed, although the voltages of cells using these metals would be relatively low.

The cathode material is a metal fluoride, wherein the metal is lower in the electromotive series than the metal employed in the anode. In addition to being lower in the electromotive series than the anode metal, it is preferred that the metal of the cathode not be beryllided by the electrolyte, which would drastically reduce the cell voltage. Nickel, copper and silver have been found to be satisfactory metals to be employed in the cathode. Nickel and silver are preferred, since nickel gives a one step discharge with Solutions I, II, and III as electrolytes (cf.—see Table I, above), and silver gives a one step discharge with Solutions II and III, whereas copper gives a two step discharge with all three of these solutions.

In order to determine the particular cathode material to employ with any particular cell, a number of factors are considered. First, the cathode material is preferably only slightly soluble in the electrolyte at the temperature of operation. Thus, at use temperatures, solubilities of the cathode material in the *electrolyte* [eleytrolyte] of from about $10^{-4}$ to about $10^{-2}$ weight percent (based on weight of electrolyte) are preferred in most cases. Solubilities less than about $10^{-4}$ are not often encountered in inorganic systems of this type. If the solubility of the cathode material is substantially higher than $10^{-2}$, the cathode material would react with the anode unless an efficient separator were provided.

The reaction occurring at the cathode should be reversible. Thus, the reactions (1) metal fluoride to metal plus fluoride ion, on discharge, and (2) fluoride ion plus metal to produce metal fluoride, on charge, should proceed readily. Also, the conductivity of the metal fluoride and elemental metal derived therefrom should be adequate. Copper fluoride, nickel fluoride, and silver fluoride have been found to satisfy these requirements of conductivity and reversibility of reaction.

Referring now to the fluozirconate system, this system can typically be considered to be a mixture of zirconium fluoride ($ZrF_4$) with alkali metal fluorides. A preferred composition in the charged state contains 10 mol percent sodium fluoride, 48 mol percent potassium fluoride, and 42 mol percent zirconium fluoride. This mixture has a melting point of 385° C. Pages 52–67 of R. E. Thoma, ORNL–2548 (op. cit., supra) display phase diagrams of various alkali metal fluoride-zirconium fluoride systems which can be used as electrolytes in the invention. As with the fluoberyllate systems, electrolyte melting points below about 600° C., and preferably below about 400° C., are most frequently employed.

The factors to be considered in determining the concentration of zirconium fluoride, and the exact nature of the components in the electrolyte, are analogous to those discussed above with respect to the fluoberyllate system.

In the fluorzirconate system, the anode is preferably zirconium, although other materials, such as titanium, which have activities slightly less than zirconium in the electromotive series can be employed.

The cathode is a metal fluoride, the metal being lower in the electromotive series than the metal of the anode. Among the metal fluorides that have been successfully employed as the cathode in the fluozirconate system, there can be mentioned copper fluoride, silver fluoride, nickel fluoride, and the like. Nickel fluoride is preferred. The factors to be considered in selecting the specific cathode material are analogous to those described above with respect to the fluoberyllate system.

The electrochemical cells of this invention can be constructed by procedures that are known in the art. As a general rule, it is desirable to electroform the anode on a support such as expanded metal, a metal screen, or a metal spiral. Inert metals such as nickel are employed as the anode support. It is preferred to electroform the anode because the resultant anode has a higher surface area, is more active, and is also in the unavoidable form that will be obtained after the first discharge-charge cycle.

The cathode can be made by conventional procedures, such as by the known preparation of pasted electrodes. A general discussion of pasted electrodes is found in G. W. Vinal, "Storage Batteries," pages 27–46, Wiley and Son (1955). A specific method of preparing pasted electrodes that has been found desirable for use in the invention is given in a paper "Non-Aqueous Lithium-Nickel Halide Batteries," presented by A. E. Lyall and H. N. Seiger at the Intersociety Energy Conversion Conference, Los Angeles, Calif. (September 1966).

The cells of the invention are preferably hermetically sealed for commercial applications. In the laboratory, it is usually more convenient to blanket the cell under an inert atmosphere such as argon or helium. The operating temperature of the cell is preferably sufficiently above the melting point of the electrolyte so that the viscosity of the electrolyte is not so high that it interferes with efficient operation of the cell. The examples below illustrate such conditions.

The thermal cells of the invention have wide utility. For instance, they can be used as heat activated *reserve* [reverse] cells for ordnance (e.g., to operate fuses, and the like). They can be used to power electric vehicles such as carts, cars, and the like.

The following examples illustrate certain aspects of the invention:

EXAMPLE 1

Figure 4:
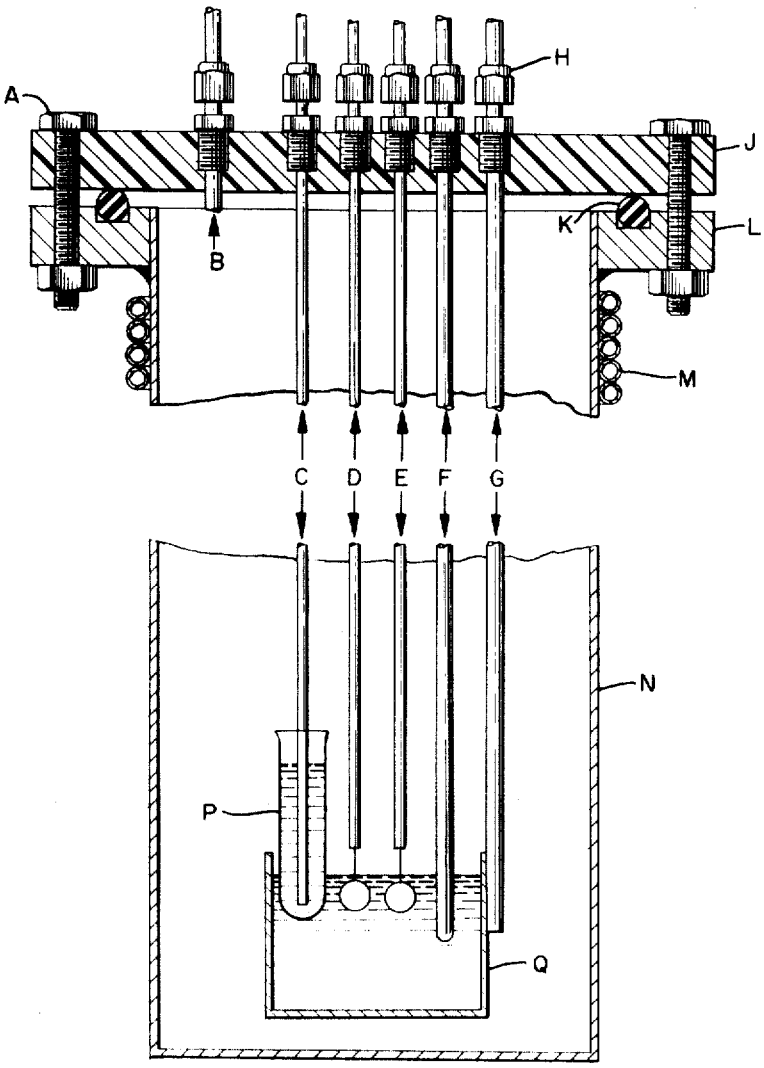
FIG. 4 is a schematic elevation, partly in section, of a test cell to which the principles of the invention can be applied.

FIG. 4 shows a schematic elevation, partly in section, of a test electrochemical cell that was constructed to demonstrate the invention. The various parts of this cell were as follows:

Legend for FIG. 4

A—Stainless steel bolt
B—¼" Nickel tube (gas exit)
C—Reference electrode ($Ni/NiF_2$)
D—Anode lead (Ni)
E—Cathode lead (Ni)
F—¼" Ni tube (sealed at bottom) (thermowell)
G—¼" Ni tube (gas inlet and crucible support)
H—SWAGELOK fittings
I—Clear PLEXIGLAS top
K—O-Ring seal
L—Steel flange
M—Water jacket (¼" copper tubing)
N—INCONEL can (0.060" wall thickness) welded to flange and at bottom
P—Reference electrode container. PYREX test tube containing 1 mol percent $NiF_2$ in same solvent as electrolyte
Q—Nickel crucible The following materials were employed in the experiments with this cell:

Materials: $BeF_2$, technical grade, was obtained from Brush Beryllium Company. It was stated to be 98.5% $BeF_2$ min. with Na—0.4%, Al—0.02%, and $$Fe+Ni+Cr—0.01\%$$

max. Be metal (strips), "high purity," was obtained from the same company. Alkali fluorides and nickel fluoride. C. P. chemicals, were obtained from Baker or Allied Chemical Company. CuF, $CuF_2$, AgF, and $AgF_2$ were prepared from reagent grade chemicals by standard methods. (Handbook of Preparative Inorganic Chemistry, G. Brauer, ed., vol. I, 2nd ed., translated by Scripta Technicia, Academic Press, New York, N.Y. (1963).)

The experimental procedure employed was as follows:

The powdered ingredients were weighed and mixed in a dry box in an argon atmosphere at a pressure of 0.2–0.5 inch of water below atmospheric. They were then charged into the crucible and envelope shown in FIG. 4, the electrodes and auxiliary equipment inserted in the plastic cover to a level which would keep them in the cold zone above the crucible and the envelope sealed with the transparent plastic cover. The assembly was then placed in a furnace in a fume hood with the temperature controlled and measured with a Chromel-Alumel thermocoupled and pyrometer controller. A mirror above the cover permitted observation of the interior of the cell. After the electrolyte was brought to the desired temperature, it was electrolyzed between beryllium electrodes to purify it partially, the originally cloudy melt becoming clear and transparent in the process. The electrolysis electrodes were than withdrawn and the test electrodes and reference electrode inserted as shown. These adjustments were made by moving the appropriate rods in the Swagelok seals without opening the cell to the atmosphere. Argon was continually passed through the system. Measurements of open-circuit potential and discharge curves were made with a Model MR Sargent recorder. Chronopotentiograms were run with 1 cm.$^2$ metal disks and potentials measured against a $Ni/NiF_2$ reference electrode in a Pyrex tube immersed in the electrolyte. (Chronopotentiograms are useful to determine the pure electrochemical characteristics of a cell, without the variations in performance and complications caused by factors such as uncontrolled mass transfer and convection. The chronopotentiogram can be considered to be a transient charge-discharge test at constant current, which measures the number of steps in the discharge, the voltage of discharge, and the extent of polarization. Chronopotentiograms are discussed in chapter 8 of "New Instrumental Methods in Electrochemistry," by Paul Delahy, Interscience Publishers, 1954.)

The Pyrex glass was a sufficiently good conductor so that no hole or wick was required in the reference half cell. A constant current power supply and Tektronix No. 535A oscilloscope with a type D plug-in unit were used and the chronopotentiograms were photographed with a Polaroid camera attached to the oscilloscope. Solubilities were determined by equilibrating the electrolyte with the desired reagent at a temperature about 50° C. above the desired temperature, dropping the temperature to the desired level and re-equilibrating, and finally sucking the saturated solution into a Pyrex tube through a porous filter disk. The sample was allowed to freeze and was then analyzed by standard methods.

The pasted electrodes were fabricated by applying a paste of varying ratios of metal fluoride powders and a 9:1 mixture, by weight, of type 38 graphite and carbon black to expanded metal or coiled wire electrode supports. In most cases, a 1:1 mixture, by weight, of metal fluoride: carbon powder was used. The paste was prepared by wetting the fluoride-carbon mixture with methanol and mixing to a creamy consistency with a gelatin-water solution (100 g./l.). The paste slurry was then spread on the metal substrate, dried to touch, pressed at 4000 pounds/inch$^2$ and dried overnight in air at 100° C.

RESULTS

The compositions of electrolyte shown in Table I have thus far been studied.

TABLE I.—ELECTROLYTE COMPOSITION (MOL. PERCENT)

| | Solution | | |
|---|---|---|---|
| | I | II | III |
| Composition: | | | |
| $BeF_2$ | 37.5 | 47.5 | 58 |
| LiF | 31.5 | | |
| NaF | 31.0 | 26.3 | |
| KF | | 26.3 | 42 |
| M.P. (° C.) | 315 | 350 | 360 |
| Resistivity (Ωcm.)[1] | 1 | 3 | 5 |

[1] Approximate values (±25% at 450° C.).

These were chosen not only for their conveniently low melting points but for the additional advantage that their melting points do not increase rapidly with added $BeF_2$. The phase diagrams for the two ternary and one binary system for which these compositions are eutectics are shown in FIGS. 1, 2, and 3[2–4]. These solutions increase in $BeF_2$, a Lewis acid, from I to III, thus tending to make III the most acid of the solutions. However, they also increase in $K^+$ (a Lewis base) relative to the other alkali ions from I→III. The solvent cation effect would thus tend to make III the most basic of the solutions. The acid-base characteristics can be expected to affect solubility of cathode materials, complex formation, cell potentials and other properties. As seen below (Table III), of these two opposing effects, that of the solvent cation is the more important within the indicated range of $BeF_2$ variation.

Anode: A solid beryllium anode in Solution I against a $Ni/NiF_2$ reference electrode had a potential of 1.9 v. at 350° C. and 1.95 v. at 400° C. Polarization of the solid anode was comparatively high, i.e., 0.5 v. at 200 ma./cm.$^2$ and 0.1 v. at 50 ma./cm.$^2$, but increasing the surface area by electrodepositing the beryllium from the fluoberyllate electrolyte resulted in undetectable polarization at 200 ma./cm.$^2$. The electroformed anode has been cycled for over two weeks without deteriorating. Operation of this electrolyte at 370° C. has been quite satisfactory. However, overnight standing at temperature on open circuit results in reduction of open circuit potential. Recharging restores the original potential.

Cathodes: Most metals such as W, Mo, Fe, Zn, and Pt are rapidly beryllided by fluoberyllate electrolytes and are difficult to charge to form cathodes. Nickel, copper and silver could be charged and discharged chronopotentiometrically with the results as shown in Table II and FIGS. 5 through 8. It will be noted that both copper and silver gave two-step reductions with Solution I as the electrolyte. In the case of copper, most of the discharge was at the lower of the two voltages. In the case of silver, the amount at each voltage varied with the charging current density. When charged at 25 ma./cm.$^2$ and discharged at 50 ma./cm.$^2$, almost all the discharge was at 1.8 v. However, when charged at 250 ma./cm.$^2$ and discharged at 50 ma./cm.$^2$, 80 percent of the discharge was at 2.75 v.

TABLE II.—CATHODE CHARACTERISTICS IN THE TERNARY BERYLLATE SOLUTION

[Electrolyte I]

| Metal | C.D., ma./cm.$^2$ | Charging voltage (v.)* | | Discharge voltage (v.) | Polarization | Coulombs discharge/Coulombs charge |
|---|---|---|---|---|---|---|
| Ni | 50 | 2.0 | | 1.95 | <50 mv. | 0.5 |
| Ni | 200 | 2.2 | | 1.80 | 150 | 0.85 |
| Cu | 50 | 2.6 | Step 1 | 2.5 | <50 mv. | 0.5 |
| | 200 | 2.75 | Step 2 | 1.85 | | |
| | 200 | 2.75 | Step 1 | 2.5 | ~50 mv. | 0.4 |
| | | | Step 2 | 1.8 | | |
| Ag | 50 1st step | 2.75 | 1st step | 2.25 | | |
| | 2d step | 2.92 | | 2d step, 1.8 | | |

*Vs. Be anode. $Ni/NiF_2$ was actually used as reference.

A $CuF_2$ pasted electrode discharged for 3 minutes at 2.55 v. but fell to 1.85 v. where it held for 8 minutes for a fairly flat discharge. CuF electrodes discharged between 2.0 and 1.8 volts for five minutes and then proceeded for 45 minutes with a reasonably flat discharge at the latter voltage. These results confirm the chronopotentiometric results indicating the low voltage step, probably $Cu^{+1} \rightarrow Cu^0$, as the dominant one in this system.

$NiF_2$ pasted electrodes gave a flat discharge at 2.0 v. Coulombic ratios on charge and discharge approached unity but very little of the total material was converted in each cycle.

Table III shows the solubility of the most promising cathode materials in the three electrolytes of Table I. As noted above, both $BeF_2$ and $K^+$ increase from I to III. Since an increase in $BeF_2$ content would be expected to reduce the solubility of metal fluorides and an increase in $K^+$ content relative to the other alkali ions would be expected to increase the metal fluoride solubility, it is clear that the solubilizing effect of $K^+$ is governing over the expected opposite effect of $BeF_2$. It also may be inferred that while Solution I is usable with any of the three cathode materials, silver fluoride is preferred for use in the other two.

TABLE III.—SOLUBILITIES OF CATHODE MATERIALS

| Material | Solution I | | Solution II | | Solution III | |
|---|---|---|---|---|---|---|
| | Temp. (° C.) | Solubility (w/o) | Temp. (° C.) | Solubility (w/o) | Temp. (° C.) | Solubility (w/o) |
| $NiF_2$ | 450 | 0.0016 | 375 | 0.17 | 375 | 4.24 |
| | | | 520 | 0.35 | 520 | 0.93 (?) |
| AgF | 410 | 0.0004 | 375 | 0.0022 | 375 | 0.0081 |
| | 500 | 0.0016 | 520 | 0.0026 | 520 | 0.0024 |
| $AgF_2$ | | | | | 380 | 0.0026 |
| | | | | | 520 | 0.0065 |
| $CuF_2$ | 355 | 0.0005 | 375 | 0.72 | | |
| | 525 | 0.0025 | 520 | 0.79 | | |

Figure 9:
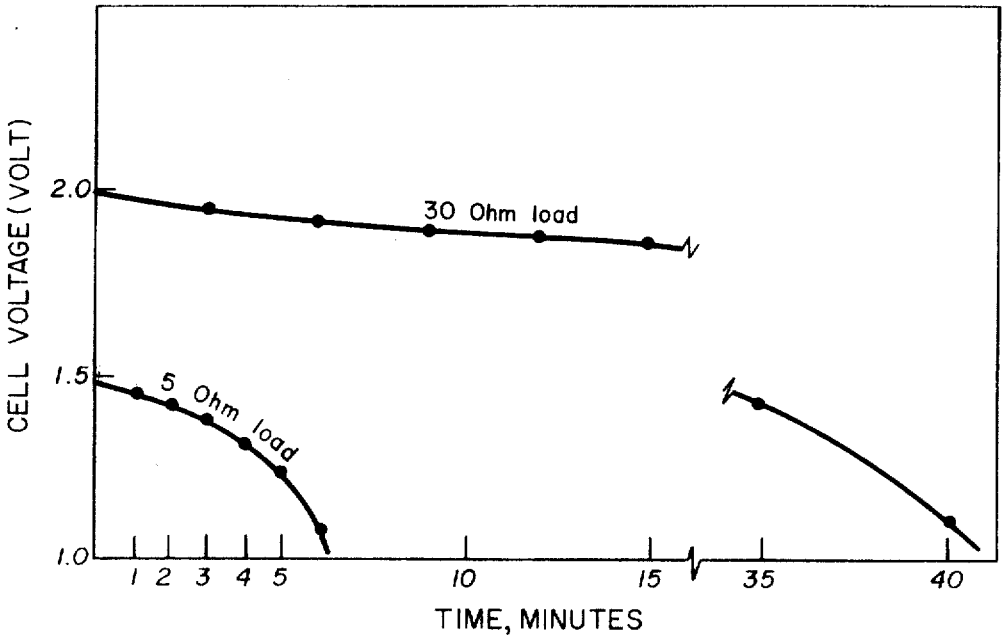
FIG. 9 is a graph of cell voltage vs. time of a cell embodying the principles of the invention, at two different load conditions.
Figure 5:
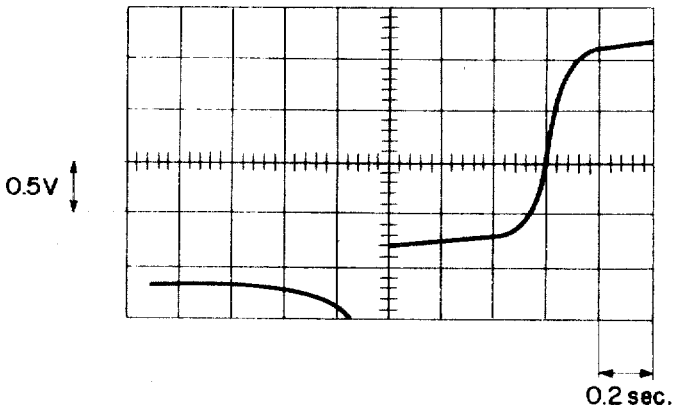
FIGS. 5–8 and 10 are chronopotentiograms of various cell systems embodying the principles of the invention.
Figure 6:
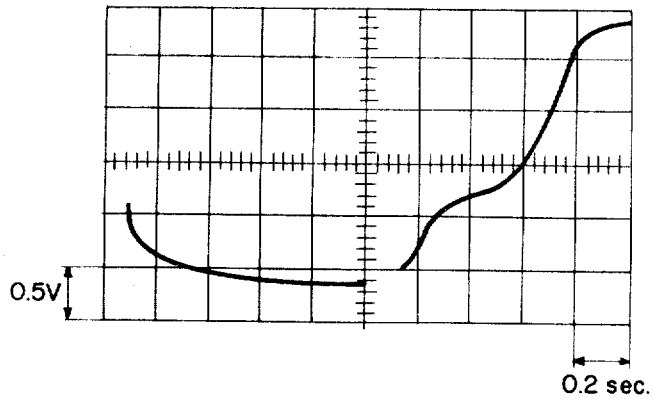
Figure 7:
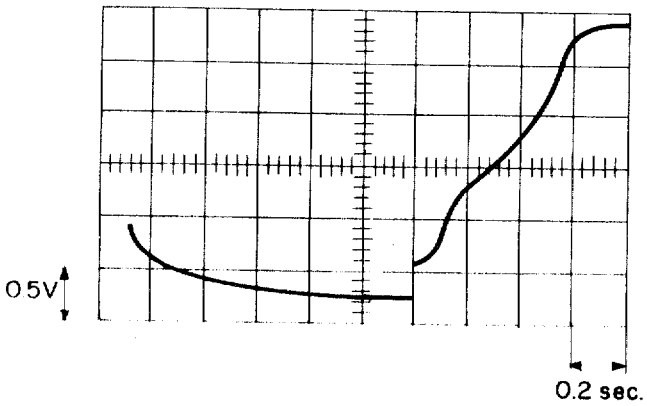
Figure 8:
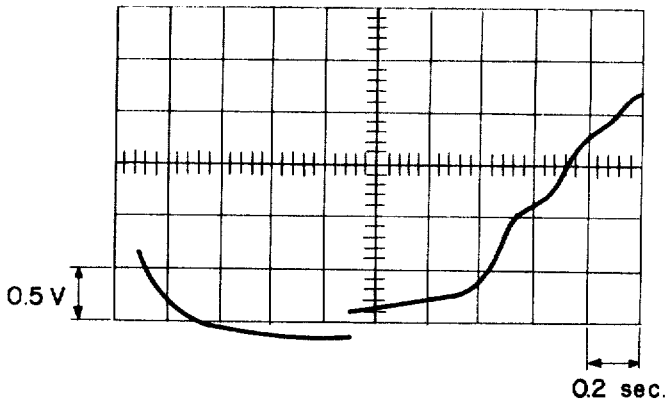

The behavior of a Be anode and $NiF_2$ cathode in Solution II at 400° C. was similar to that in Solution I. Pasted electrodes discharged somewhat more completely, in that a discharge at 1.9 v. and 65 ma./cm.$^2$ remained nearly flat for 30 minutes, and at 1.5 v. and 300 ma./cm.$^2$, the cell ran with moderate polarization for 5 minutes. These *discharge* [discharged,] curves are shown in FIG. 9. $CuF_2$ showed a two-step reduction at 2.4 v. and 1.8 v., very simi-

Figure 10:
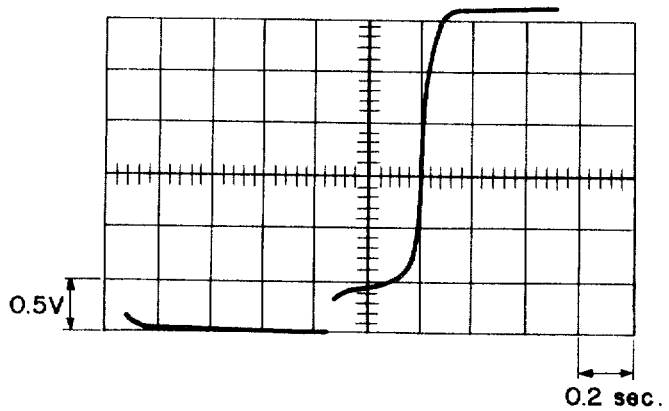

[2] R. E. Thoma, ORNL-2548, pp. 42–43 (November 1959).
[3] R. E. Thoma, ibid, p. 46 (November 1959).
[4] R. E. Thoma, ibid, pp. 36–37 (November 1959).

lar to its behavior in Solution I. Silver fluoride, however, gave a single step reduction at 2.6 v. compared to the two-step reduction at 2.75 v. and 1.8 v. observed in Solution I. Discharge[d] at 100 ma./cm.$^2$ was accompanied by a polarization of 170 mv. (almost all of which was IR in the solution) as shown in FIG. 10. A sheet of silver discharged at 90 ma./cm.$^2$ immediately after charging ran for 2.5 minutes at 2.75 v. The stabilization of the higher voltage discharge of silver flouride will be discussed further below.

Since solubilities were undoubtedly too high in Solution III for materials other than silver fluoride; only this compound was used as cathode. One considerable advantage of Solution III is that its phase diagram permits the widest variation in compositions at 40° C. while still remaining liquid. $BeF_2$, for instance, may be varied from 52 to 78 mol. percent at this temperature. A single step discharge at 2.5 v. and 25 ma./cm.$^2$, 2.4 v. and 50 ma./cm.$^2$, 2.2 v. and 100 ma./cm.$^2$, and 2.0 v. at 200 ma./cm.$^2$ was obtained with a Be anode and silver fluoride cathode. Since the current density-voltage relationship was essentially linear from 10–200 ma./cm.$^2$, the polarization is apparently entirely IR, either in the electrolyte or in the electrode and should be improved by better design and construction.

EXAMPLE 2

By procedures analogous to those described in Example 1, a fluozirconate cell was tested. The anode was zirconium sheet, the cathode was pasted nickel fluoride, and the electrolyte comprised 10 mole percent sodium fluoride, 48 mole percent potassium fluoride, and 42 mole percent zirconium fluoride. The open circuit voltage of this cell was 1.53 volts at 420° C., and it charged and discharged at an anode current density of 15–20 ma./cm.$^2$ at 1.45 volts. At 535° C., it charged and discharged at 200 ma./cm.$^2$ at 1.00 volt. The cell was operated at temperatures of from 400° to 800° C.

What is claimed is:

1. A rechargeable thermal electrochemical cell having an anode, a cathode, and an electrolyte in contact with said anode and cathode, wherein, in the charged condition:

(a) said electrolyte comprises alkali metal fluometalate, wherein said *fluometalate* [metalate] is *fluoberyllate* [beryllate] or *fluozirconate* [zirconate];

(b) said anode consists essentially of a metal equal in activity to or less active in the electromotive series than the metal of said *fluometalate* [metalate]; and (c) said cathode comprises nickel fluoride, silver fluoride, or copper fluoride.

2. The cell of claim 1 wherein said electrolyte is an alkali metal *fluoberyllate* [beryllate].

3. The cell of claim 2 wherein the anode is beryllium.

4. The cell of claim 3 wherein the electrolyte has a melting point between about 350° C. and about 600° C., and wherein the solubility of the cathode in said electrolyte is from about $10^{-4}$ to about $10^{-2}$ weight percent, based on weight of electrolyte.

5. The cell of claim 4 wherein the electrolyte has a melting point below about 400° C.

6. The cell of claim 4 wherein the electrolyte contains lithium fluoride, potassium fluoride, sodium fluoride, or mixtures thereof.

7. The cell of claim 5 wherein the electrolyte consists essentially of beryllium fluoride, lithium fluoride, and sodium fluoride.

8. The cell of claim 7 wherein the proportions of the components in the electrolyte are approximately 37.5 mole percent beryllium fluoride, 31.5 mole percent lithium fluoride, and 31 mole percent sodium fluoride.

9. The cell of claim 7 wherein the cathode is nickel fluoride.

10. The cell of claim 5 wherein the electrolyte consists essentially of beryllium fluoride, sodium fluoride, and potassium fluoride and wherein the cathode is silver fluoride.

11. The cell of claim 10 wherein the proportions of the components of the electrolyte are approximately 47.5 mole percent beryllium fluoride, 26.3 mole percent sodium fluoride, and 26.3 mole percent potassium fluoride.

12. The cell of claim 5 wherein the electrolyte consists essentially of beryllium fluoride and potassium fluoride, and wherein the cathode is silver fluoride.

13. The cell of claim 12 wherein the proportions of the components in the electrolyte are approximately 58 mole percent beryllium fluoride and 42 mole percent potassium fluoride.

14. The cell of claim 1 wherein the electrolyte is an alkali metal fluozirconate.

15. The cell of claim 14 wherein the anode is zirconium.

16. The cell of claim 15 wherein the electrolyte has a melting point between about 350° C. and about 600° C., and wherein the solubility of the cathode in the electrolyte is from about $10^{-4}$ to about $10^{-2}$ weight percent, based on weight of electrolyte.

17. The cell of claim 16 wherein the electrolyte has a melting point between about 400° C.

18. The cell of claim 17 wherein the electrolyte consists essentially of sodium fluoride, potassium fluoride, and zirconium fluoride.

19. The cell of claim 18 wherein the proportions of the components of the electrolyte are approximately 10 mole percent sodium fluoride, 48 mole percent potassium fluoride, and 42 mole percent zirconium fluoride.

20. The cell of claim 18 wherein the cathode is nickel fluoride.

21. The cell of claim 19 wherein the cathode is nickel fluoride.

References Cited

The following references, cited by the Examiner, are of record in the patented file of this patent or the original patent.

UNITED STATES PATENTS

| | | | |
|---|---|---|---|
| 3,591,418 | 7/1971 | Sutula | 136—83 T |
| 3,350,230 | 10/1967 | Pannenberger et al. | 136—86 F |
| 3,488,221 | 1/1970 | Shimatake et al. | 136—6 LF |

FOREIGN PATENTS

| | | | |
|---|---|---|---|
| 1,070,937 | 6/1967 | Great Britain | 136—153 |

ALLEN B. CURTIS, Primary Examiner

C. F. LEFEVOUR, Assistant Examiner

U.S. Cl. X.R.

136—153, 155